United States Patent Office 3,365,451
Patented Jan. 23, 1968

3,365,451
TERTIARY AMINO ALCOHOLS OF THE
CYCLOBUTANE SERIES
Kent C. Brannock and James C. Martin, Kingsport, Tenn.,
assignors to Eastman Kodak Company, Rochester,
N.Y., a corporation of New Jersey
No Drawing. Continuation of application Ser. No.
112,794, May 26, 1961. This application Jan. 27,
1967, Ser. No. 612,279
11 Claims. (Cl. 260—247.7)

This invention relates to cyclobutane derivatives.

This application is a streamlined continuation application of application S.N. 112,794, filed May 26, 1961, now abandoned.

It is an object of this invention to provide novel amino alcohols of the cyclobutane series.

It is another object of this invention to provide novel cyclobutane derivatives having both tertiary amine and hydroxyl groups.

It is another object of this invention to provide a new class of cyclobutane derivatives that have utility as stabilizers for fuel oils, chemical intermediates for preparing fiber-forming polymers, pharmaceuticals and other uses.

Other objects of the invention will be apparent from the description and claims which follow.

The cyclobutane derivatives of the invention have the following formulas:

Compound I

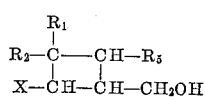

and

Compound II

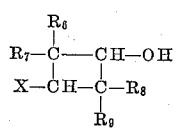

wherein $R_1$ and $R_2$ are monovalent organic radicals or divalent radicals which, together with the adjacent carbon atom on the cyclobutane ring, form an organic ring; wherein $R_5$ is a monovalent organic radical; wherein $R_6$, $R_7$, $R_8$ and $R_9$ are hydrogen, monovalent organic radicals or divalent radicals, which together with the adjacent carbon atom on the cyclobutane ring, form an organic ring; and wherein X is a tertiary amine radical having a nitrogen atom attached to the adjacent carbon atom on the cyclobutane ring. The substituent X typically has the formula

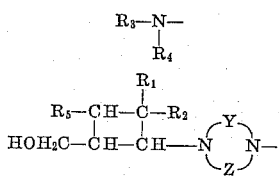

or

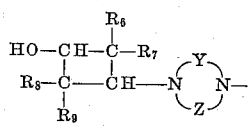

In the above formulas $R_1$ and $R_2$ are typically: (a) alkyl radicals having 1 to 18, and desirably 1 to 8, carbon atoms such as methyl, ethyl, isopropyl, n-butyl, amyl, 2-ethyl-hexyl, n-octyl, lauryl, myristyl, stearyl and the like; (b) thienyl radicals, e.g.

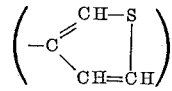

(c) allyl radicals ($CH_2=CHCH_2—$); (d) carbalkoxy radicals

wherein the alkyl moiety (R) has 1 to 8 carbon atoms such as methyl, ethyl, n-propyl, isopropyl, isobutyl, amyl, 2-ethylhexyl, n-octyl and the like; (e) carbon and hydrogen atoms which, together with the adjacent carbon atom on the cyclobutane ring, form a carbocyclic ring having 5 to 7 carbon atoms such as cyclopentane; cyclohexane, norbornane, norbornene and related rings; (f) carbon, hydrogen and oxygen atoms which, together with the adjacent carbon atom on the cyclobutane ring, form a heterocyclic ring having 5 carbon atoms and an oxygen atom such as pyran rings and the like; or (g) phenyl radicals. In the above formulas $R_6$, $R_7$, $R_8$ and $R_9$ are typically selected from the same group of substituents (a) through (g) above, as indicated for $R_1$ and $R_2$ and, in addition $R_6$, $R_7$, $R_8$ and $R_9$ can be hydrogen. In the above formulas $R_3$ and $R_4$ are typically: (a) alkyl radicals having 1 to 8 carbon atoms such as methyl, ethyl, isopropyl, isobutyl, n-butyl, n-hexyl, 2-ethylhexyl, n-octyl and the like; (b) carbon and hydrogen atoms which, together with the adjacent nitrogen atom, form a heterocyclic ring having 4 to 8 carbon atoms such as piperidine, methyl-substituted piperidines, pyrrolidine, 3-azabicyclo[3.2.2.]nonane and related rings; or (c) carbon, hydrogen and oxygen atoms which, together with the adjacent nitrogen atom, form a morpholine ring. In the above formulas $R_5$ can be a hydrogen atom or a methanol radical (—$CH_2OH$). In the above formulas Y and Z are alkylene radicals having 2 to 4 carbon atoms and form such ring structures as piperazine and methyl-substituted piperazine rings.

Typical cyclobutane derivatives of the invention include:

3-dimethylamino-2,2,4,4-tetramethylcyclobutanol,
3-di-n-octylamino-2,2,4,4-tetrastearylcyclobutanol,
3-di-n-butylamino-2,2,4,4-tetraethylcyclobutanol,
2,2,4,4-tetramethyl-3-(3-azabicyclo[3.2.2.]nonan-3-yl)cyclobutanol,
3-piperidino-2,2,4,4-tetramethylcyclobutanol,
2,2,4,4-tetramethyl-3-(4-methylpiperazino)cyclobutanol,
3-pyrrolidino-2,2,4,4-tetra-n-butylcyclobutanol,
3,3'-(1,4-piperazinediyl)bis[2,2,4,4-tetramethylcyclobutanol],
3-morpholino-2,2,4,4-tetra-n-propylbutanol,
3-dimethylamino-2-ethyl-4,4-dimethyl-2-(2-thienyl)cyclobutanol,
2,2-dimethyl-3-piperidinospiro[3.5]nonan-1-ol,
3-dimethylamino-2,2-di-n-heptyl-4,4-diphenylcyclobutanol,
3-dimethylamino-4-ethyl-2,2,4-trimethylcyclobutanol,
3-diethylamino-2-dodecyl-2-ethyl-4,4-dimethylcyclobutanol,
2,2-diethyl-3-pyrrolidinospiro[3.4]octan-1-ol,
2-allyl-3-dimethylamino-2,4,4-trimethylcyclobutanol,
2-dimethylamino-3,3-dimethylcyclobutane methanol,
2-carbethoxy-3-dimethylamino-2-ethyl-4,4-dimethylcyclobutanol,
2-di-n-propylamino-3,3-di-n-butylcyclobutane methanol,
4-dimethylamino-3,3-dimethylspiro[cyclobutane-1,2'(2,3-dihydro-4'H pyran)-2-ol]

3,3-dimethyl-2-morpolinocyclobutane methanol,
3-methyl-3-phenyl-2-dimethylaminocyclobutane-
  methanol,
3,3-dimethyl-2-piperidinocyclobutane methanol,
3-lauryl-3-phenyl-4-dimethylamino-1,2-cyclobutane-
  methanol,
3,3-di-n-butyl-2-pyrrolidinocyclobutanemethanol,
4(3-azabicyclo[3.2.2]nonan-3-yl)3,3-dimethylcyclo-
  butanemethanol,
1-piperidinospiro[3.5]nonane-2-methanol,
2-di-n-octylaminospiro(cyclobutane-1,2'-[5]nor-
  bornene)-3-methanol,
1-pyrrolidinospiro[3.4]octane-2-methanol,
2-diethylaminospiro(cyclobutane-1,2'-norbornane)-3-
  methanol,
4-dimethylamino-3,3-dimethylcyclobutane-1,2-
  dimethanol,
3-dimethylamino 5-oxaspiro[3.5]non-6-ene-2-methanol,
4-di-n-butylamino-3,3-diethylcyclobutane-1,2-
  dimethanol,
4-di-n-octylamino-3,3-distearylcyclobutane-1,2-
  dimethanol,
3-dimethylamino 5-oxaspiro[3.5]nonane-2-methanol,
2,2'-(1,4-piperazinediyl)bis[3,3-dimethylcyclobutane-
  methanol],
3,3-dimethyl-4-pyrrolidinocyclobutane-1,2-dimethanol,
3,3-dimethyl-4-piperidinocyclobutane-1,2-dimethanol,
3,3-di-n-butyl-4-morpholinocyclobutane-1,2-dimethanol,
2-ethyl-3-piperidinocyclobutanol,
2-ethyl-4,4-dimethyl-3-piperidinocyclobutanol,
2,2-dimethyl-3-dimethylaminocyclobutanol,
3-dibenzylamino-2,2-dimethylcyclobutanol,
3-dimethylaminocyclobutanol,
3-dimethylamino-2-methylcyclobutanol,
2,2-diethyl-3-dimethylaminocyclobutanol,
3-dimethylamino-2,2,4-trimethylcyclobutanol,
3-piperidino-4-ethyl-2,2-diphenylcyclobutanol, and related cyclobutane derivatives.

The subject derivatives having the formula of Compound I above can be prepared by reducing the corresponding ester with a metal hydride such as lithium aluminum hydride, the ester being prepared by reacting certain enamines and olefins containing ester groups. This reaction can be represented by the following series of equations illustrating the preparation of a typical cyclobutane derivative of the invention:

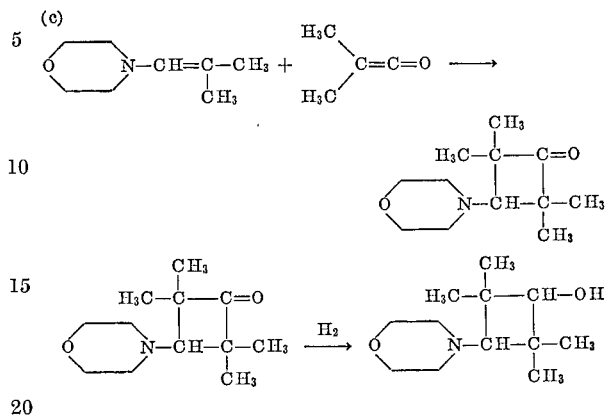

The preparation of the ester materials by reacting certain enamines and substituted olefins as illustrated by reaction (a) above is described in detail in the copending application of Brannock U.S. Ser. No. 34,881 filed June 9, 1960, titled, "Cyclobutane Derivatives."

The subject derivatives having the formula of Compound II above can be prepared by reducing the corresponding ketone with a metal hydride such as sodium or potassium borohydride or lithium aluminum hydride, the ketone being prepared by reacting certain enamines and ketenes. This reaction can be represented by the following series of equations illustrating the preparation of a typical cyclobutane derivative of the invention:

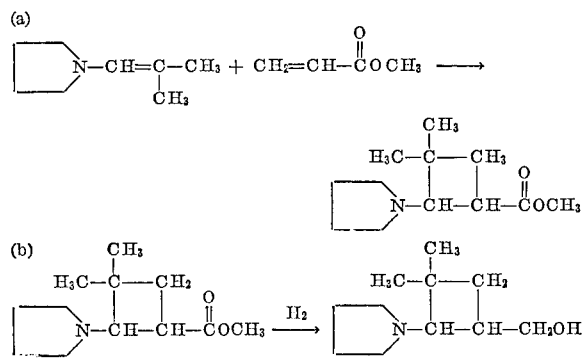

The preparation of the ketone materials by reacting certain enamines and ketenes as illustrated by reaction (c) above is described in detail in the application of James C. Martin titled "Substituted Cyclobutanones," Ser. No. 71,397, filed Nov. 25, 1960, now abandoned, and in the continuation-in-part thereof of the same title Ser. No. 112,789 which was filed concurrently herewith.

The cyclobutane derivatives of the invention have a wide variety of uses including use as chemical intermediates, as stabilizers for fuel oil, as modifiers for polymers to impart improved dyeability to fibers of the polymer, and numerous other uses. As mentioned in my application, "Substituted Cyclobutanones," cited above and filed concurrently herewith, the cyclobutanol compounds (Compound II type) of the present invention wherein one or more of the substituents $R_6$, $R_7$, $R_8$ or $R_9$ is hydrogen have better thermal stability than the corresponding cyclobutanones from which they are derived. Therefore, the novel cyclobutanols are useful derivatives for preserving the cyclic structure of the parent cyclobutanones having low thermal stability.

The invention is further illustrated by the following examples of preferred embodiments thereof.

*Example 1*

A solution of methyl 2-dimethylamino-3,3-dimethylcyclobutane carboxylate (56 g., 0.3 mole) in 250 ml. of ether was added dropwise to lithium aluminum hydride (7.6 g., 0.2 mole) in 150 ml. of ether at a rate such as to maintain the ether at reflux. The mixture was stirred for one hour and ethyl acetate (8.8 g.) was added followed by water (18 ml.). The mixture was filtered and the filtrate distilled to give, after removal of ether, 30 g. (64%) of 2-dimethylamino-3,3-dimethylcyclobutane methanol, B.P. 71–73° at 1 mm., $n_D^{20}$ 1.4644.

*Example 2*

In a like manner as described in Example 1, 3,3-dimethyl - 2 - morpholinocyclobutane methanol, B.P. 99–103° at 1.5–1.8 mm., M.P. 151–3°, was prepared in 76% yield by reducing methyl 3,3-dimethyl-2-morpholinocyclobutane carboxylate.

*Example 3*

In a like manner as described in Example 1, 1-piperidinospiro[3.5]nonane-2-methanol, M.P. 105–106.5°, was prepared by reducing methyl 1-piperidinospiro[3.5] nonane-2-carboxylate.

*Example 4*

In a like manner as described in Example 1, reduction of diethyl 4-dimethylamino-3,3-dimethylcyclobutane-1,2-dicarboxylate with lithium aluminum hydride gave a 52% yield of 4-dimethylamino-3,3-dimethylcyclobutane-1,2-dimethanol, B.P. 133–6° at 1 mm., $n_D^{20}$ 1.4821.

Example 5

In a like manner as described in Example 1, 3,3-dimethyl - 4 - pyrrolidinocyclobutane - 1,2 - dimethanol, B.P. 151–154° at 1.5–1.8 mm., $n_D^{20}$ 1.4986 was obtained by reducing dimethyl 3,3-dimethyl-4-pyrrolidinocyclobutane-1,2-dicarboxylate.

Example 6

To a stirred solution of 50 g. (0.3 mole) of 3-dimethylamino - 2,2,4,4 - tetramethylcyclobutanone in 75 ml. of ethanol was added slowly a solution of 3.8 g. (0.1 mole) of sodium borohydride in 25 ml. of water. The reaction was exothermic, but the temperature was kept at 25–30° C. by means of a water bath. The reaction mixture was stirred for 1 hr. after the addition was complete, then heated in an evaporating dish on the steam bath for 1 hr. To this residue was added 300 ml. of ether. The ether layer was separated, washed with water and dried over anhydrous magnesium sulfate. Evaporation of this solution yielded 46.8 g. (92%) of 3-dimethyl amino-2,2,4,4-tetramethylcyclobutanol as a white crystalline solid. To prepare a sample for analysis, some of this solid was dissolved in warm hexane and the solution chilled in Dry Ice to precipitate the solid. A material of M.P. 70–72° C. was obtained by rapid filtration of this solution.

Analysis.—Calcd. for $C_{10}H_{21}NO$: C, 70.3; H, 12.3; N, 8.2; neut. equiv., 171. Found: C, 70.3; H, 12.5; N, 8.1; neut. equiv., 171.8. A derivative of 3-dimethylamino-2,2,4,4-tetramethylcyclobutanol was prepared by heating it with phenyl isocyanate containing a small amount of triethylamine. The phenyl urethane was recrystallized two times from hexane to give a product, M.P. 134–135.5° C.

Analysis.—Calcd. for $C_{17}H_{26}N_2O_2$: C, 70.4; H, 9.0; N, 9.7. Found: C, 70.4; H, 9.0; N, 9.7.

Example 7

Using the method described in Example 6, 3-piperidino - 2,2,4,4 - tetramethylcyclobutanone was reduced to 3-piperidino-2,2,4,4-tetramethylcyclobutanol. An analytical sample was recrystallized from hexane to give a material, M.P. 92–94° C.

Analysis.—Calcd. for $C_{13}H_{25}NO$: C, 74.0; H, 11.8; N, 6.6; neut. equiv., 211. Found: C, 73.8; H, 11.6; N, 6.5; neut. equiv., 212.

Example 8

Using the method described in Example 6, 2,2-dimethyl-3-piperidinospiro[3.5]nonan-1-one was reduced to 2,2-dimethyl-3-piperidinospiro[3.5]nonan-1-ol. An analytical sample was recrystallized from a hexane-benzene mixture to give a material, M.P. 140–142° C.

Analysis.—Calcd. for $C_{16}H_{29}NO$: C, 76.6; H, 11.5; N, 5.6; neut. equiv, 251. Found: C, 76.5; H, 11.3; N, 5.2; neut. equiv., 253.

Example 9

A solution of 45 g. (0.2 mole) of 3-dimethylamino-2,2,4,4-tetraethylcyclobutanone in 150 ml. of ether was added slowly to a stirred suspension of 5.7 g. (0.15 mole) of lithiumaluminum hydride in 100 ml. of ether. An exothermic reaction took place, but the temperature was kept at 20–30° C. by an ice bath. Stirring was continued at 25° C. for 2 hrs. after the addition. Taking adequate precautions to cool the reaction, 7.0 g. of ethyl acetate was added, followed by 15 ml. of water. The resulting slurry was filtered and the solid washed several times with ether. The filtrate was dried over anhydrous magnesium sulfate. Evaporation of this solution yielded 43.4 g. (96%) of the crude 3-dimethylamino-2,2,4,4-tetraethylcyclobutanol as a crystalline residue, M.P. 70–76° C. This material was recrystallized from hexane to give 27.8 g. of material, M.P. 76–78° C.

Analysis.—Calcd. for $C_{14}H_{38}NO$: C, 74.0; H, 12.8; N, 6.2. Found: C, 74.1; H, 12.8; N, 6.3.

Example 10

A solution of 0.5 mole of 2-ethyl-3-piperidinocyclobutanone in 200 ml. of ether was added dropwise to a stirred suspension of 14.2 g. (0.375 mole) of lithium aluminum hydride in 250 ml. of ether. An ice bath was used to keep the reaction temperature at 15 to 25° C. After the addition was complete, stirring was continued for 1 hour at 25° C., then 14 ml. of water was slowly added followed by 10 ml. of 20% sodium hydroxide solution and 49 ml. of water. The solid that formed was removed by filtration. Distillation of the filtrate gave 65.1 g. (71%) of 2-ethyl-3-piperidinocyclobutanol, B.P. 95° C. (5 mm.) $n_D^{20}$ 1.4930.

Analysis.—Calcd. for $C_{11}H_{21}NO$: C, 72.1; H, 11.5; N, 7.7. Found: C, 72.2; H, 11.7; N, 7.6.

Example 11

In the manner described in Example 10, a solution of 0.5 mole of 2-ethyl-4,4-dimethyl-3-piperidinocyclobutanone in 200 ml. of ether and 14.2 g. (0.375 mole) of lithium aluminum hydride in 250 ml. of ether gave 71.2 g. (68%) of 2-ethyl-4,4-dimethyl-3-piperidinocyclobutanol, B.P. 87–89° C. (0.5 mm.).

Analysis.—Calcd. for $C_{13}H_{25}NO$: C, 73.9; H, 11.9; N, 6.6. Found: C, 73.8; H, 11.9; N, 6.8.

Example 12

In the manner described in Example 10, a solution of 0.5 mole of 2,2-dimethyl-3-dimethylaminocyclobutanone in 200 ml. of ether and 14.2 g. (0.375 mole) of lithium aluminum hydride in 250 ml. of ether gave 45.7 (64%) of 2,2 - dimethyl-3-dimethylaminocyclobutanol, B.P. 75° C. (4 mm.). This solidified on cooling to room temperature.

Analysis.—Calcd. for $C_8H_{17}NO$: C, 67.1; H, 11.9; N, 9.8. Found: C, 67.3; H, 11.8; N, 9.7.

Example 13

Using the same general procedure as described in Example 9, the substituted cyclobutanols in Table A were prepared from the corresponding cyclobutanones.

TABLE A

| Product | M.P., ° C. |
| --- | --- |
| 2,2,4,4-tetramethyl-3-(3-azabicyclo[3.2.2]nonan-3-yl) cyclobutanol. | 163–165. |
| 2,2,4,4-tetramethyl-3-(4-methylpiperazino)cyclobutanol. | 54. |
| 3,3'-(1,4-piperazinediyl)bis[2,2,4,4-tetramethylcyclobutanol]. | ~300 (dec.). |
| 3-dibutylamino-2,2,4,4-tetramethylcyclobutanol | 151–153* (1 mm.). |
| 3-dimethylamino-2-ethyl-4,4-dimethyl-2-(2-thienyl) cyclobutanol. | 122* (2 mm.). |
| 3-dimethylamino-2,2-dimethyl-4,4-diphenylcyclobutanol. | 182. |
| 3-dimethylamino-2,2-diethyl-4,4-dimethylcyclobutanol. | 74. |
| 3-dimethylamino-2,2-diheptyl-4,4-dimethylcyclobutanol. | 86–88. |
| 3-dimethylamino-2-dodecyl-2-ethyl-4,4-dimethylcyclobutanol. | 181–184* (0.3 mm.). |
| 2-allyl-3-dimethylamino-2,4,4-trimethylcyclobutanol. | 108–110* (4 mm.). |
| 2-carbethoxy-3-dimethylamino-2-ethyl-4,4-dimethylcyclobutanol. | 164–165* (0.5 mm.). |
| 3-dimethylamino-2-hexyl-2,4,4-trimethylcyclobutanol. | 148–150* (2 mm.). |
| 4-dimethylamino-3,3-dimethylspiro[cyclobutane-1,2'(2,3-dihydro-4'H pyran)-2-ol]. | 110-111* (1 mm.). |

*Boiling point.

Example 14

Using the same general procedure described in Example 1, the cyclobutane methanol derivatives in Table B were prepared by reducing with lithium aluminum hydride the corresponding methyl carboxylic acid ester.

TABLE B

| Product | B.P., °C. |
|---|---|
| 3-methyl-3-phenyl-2-dimethylaminocyclobutanemethanol | 124–131 (ca. 0.25 mm.). |
| 3-methyl-3-phenyl-4-dimethylamino-1,2-cyclobutanedimethanol | 160–170 (ca. 0.25 mm.). |
| 4-(3-azabicyclo[3.2.2]nonan-3-yl)3,3-dimethylcyclobutanemethanol | 128–131 (0.6 mm.). |
| 2-dimethylaminospiro(cyclobutane-1,2'-[5]norbornene)-3-methanol | 116–120 (0.5 mm.). |
| 2-dimethylaminospiro(cyclobutane-1,2'-norbornane)-3-methanol | 106–109 (0.3 mm.). |
| 3-dimethylamino 5-oxaspiro[3.5]non-6-ene-2-methanol | 120–126 (ca. 1 mm.). |
| 3-dimethylamino 5-oxaspiro[3.5]nonane-2-methanol | 117–123 (ca. 1 mm.). |

*Example 15*

By the general procedure described in Example 10, the 3-aminocyclobutanols in Table C were prepared from the corresponding 3-aminocyclobutanones:

TABLE C

| Product | B.P., °C. |
|---|---|
| 3-dibenzylamino-2,2-dimethylcyclobutanol | 104–107 (2 mm.). |
| 3-dimethylaminocyclobutanol | 79 (17 mm.). |
| 3-dimethylamino-2-methylcyclobutanol | 70–73 (6 mm.). |
| 3-dimethylamino-2,2,4-trimethylcyclobutanol | 84–86 (4 mm.). |
| 3-piperidino-4-ethyl-2,2-diphenylcyclobutanol | 142–147 (ca. 0.2 mm.). |
| 2,2-diethyl-3-dimethylaminocyclobutanol | 92–93 (6 mm.). |

*Example 16*

Utility as stabilizers for No. 2 fuel oil of several typical compounds of the invention was determined by the Cities Service Oil Company accelerated stability test [Anal. Chem., 24, 1959 (1951)]. Three hundred and fifty milliliter oil samples are heated at 100° C. in glass tubes while air is blown through the oil. At the end of the heating period the entire sample is filtered through a 7-cm. No. 1 Whatman filter paper, the tube and the paper are rinsed with light naphtha and the paper is air-dried. The sludge retained on the paper is compared visually with a set of standards ranging from 0 (no visible sludge) to 10 (heavy black deposit). Also the color of the aged oil is determined with the ASTM Union Colorimeter. The basis for additive effectiveness is any reduction in filter pad sludge and oil color compared to the control oil. The results of the stability tests are summarized by the data set out in Table D.

TABLE D

| Additive (0.02 weight percent) | Results of Cities Service Test in Oil in 16 Hr. at 100° C. and 10 Liters of Air/Hr. | |
|---|---|---|
| | Filter Pad Deposit | Oil Color |
| 2-dimethylamino-3,3-dimethylcyclobutanemethanol | 4.5 | 2.5 |
| 3,3-dimethyl-2-morpholinocyclobutanemethanol | 4.5 | 3 |
| 1-piperidinospiro[3.5]nonane-2-methanol | 4 | 2.5 |
| 4-dimethylamino-3,3-dimethylcyclobutane-1,2-dimethanol | 4.5 | 3 |
| None (control) | 5.5 | 4 |

*Example 17*

To a stirred, refluxing solution of 34.2 g. (0.2 mole) of 3-dimethylamino-2,2,4,4-tetramethylcyclobutanol in 200 ml. of benzene was added dropwise a solution of 20.9 g. (0.2 mole) of methacrylyl chloride in 50 ml. of benzene. The addition required 30 min. and refluxing was continued for an additional 30 min. After cooling, 100 ml. of water was added. The solution was then neutralized with sodium bicarbonate solution. The organic layer was separated, washed with water and dried over anhydrous magnesium sulfate. Distillation of this solution through a 6-in. Vigreux column gave 38.3 g. (80%) of 3-dimethylamino-2,2,4,4-tetramethylcyclobutanol methacrylate, B.P. 71–74° C. (1 mm.).

*Example 18*

A mixture consisting of 38 g. of acrylonitrile, 2 g. of 3-dimethylamino-2,2,4,4-tetramethylcyclobutanol methacrylate, 0.14 g. of the hydrochloride of 2,2'-diguanyl-2,2'-azopropane, 0.4 g. lauryl sulfate and 160 ml. of water was sealed in a bottle under an atmosphere of nitrogen and tumbled in a 65° C. water bath for 18 hours. The resulting emulsion was broken with sodium sulfate. The polymer was isolated by filtration and washed thoroughly with water. The dried polymer weighed 28.8 g. (72%). Elemental analysis indicated that the material was a copolymer of acrylonitrile and 3-dimethylamino-2,2,4,4-tetramethylcyclobutanol methacrylate. This polymer was dissolved in dimethylformamide and dry spun to give strong fibers. These fibers were more readily dyeable and exhibited a better affinity for dyes than did unmodified polyacrylonitrile fibers.

In the above examples, the "ether" solvent used was diethyl ether.

Thus, the present invention provides a useful, novel class of cyclobutane derivatives.

The invention has been described in detail with particular reference to preferred embodiments thereof, but it will be understood that variations and modifications can be effected within the spirit and scope of the invention as described hereinabove and as defined in the appended claims.

This application is a continuation-in-part of our copending U.S. application Ser. No. 71,398, "Tertiary Amino Alcohols of the Cyclobutane Series" filed Nov. 25, 1960, now abandoned.

We claim:

1. A cyclobutane derivative having a formula selected from the class consisting of

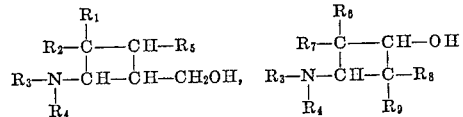

and

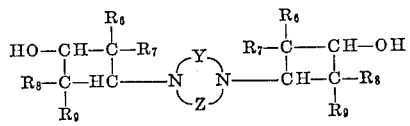

in which $R_1$ and $R_2$ are lower alkyl; $R_3$ and $R_4$, taken singly, are selected from the class consisting of (a) alkyl of 1 to 8 carbon atoms, and
(b) benzyl;

$R_3$ and $R_4$, together with the adjacent nitrogen atom, form a heterocyclic ring selected from the class consisting of piperidino, pyrrolidino, 3 - azabicyclo[3.2.2]nonan - 3 - yl, morpholino, and 4-methylpiperazino; $R_5$ is hydrogen or —$CH_2OH$; $R_6$, $R_7$, $R_8$ and $R_9$ taken singly are selected from the class consisting of (a) alkyl of 1 to 18 carbon atoms,
(b) thienyl,
(c) allyl,
(d) carbalkoxy wherein the alkoxy moiety has 1 to 8 carbon atoms,
(e) phenyl, and
(f) hydrogen;

$R_6$ and $R_7$, together with the adjacent carbon atom on the cyclobutane ring, form a ring selected from the class consisting of cyclohexane, cyclopentane, 1,4-dihydropyran, tetrahydropyran, norbornene, and norbornane; wherein Y and Z are alkylene each having 2 to 4 carbon atoms.

2. A cyclobutane derivative according to claim 1 having the formula:

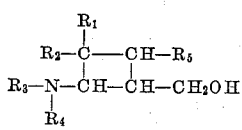

in which $R_1$ and $R_2$ are lower alkyl,

is di (lower alkyl) or a saturated cyclic amino group of 5 to 6 ring members, and $R_5$ is hydrogen or —$CH_2OH$.

3. A cyclobutane derivative according to claim 1 having the formula:

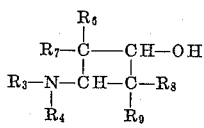

or the formula:

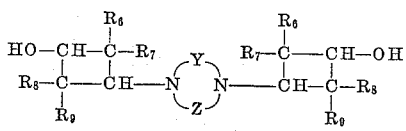

in which $R_3$ and $R_4$, taken singly, are:
  (a) alkyl of 1 to 18 carbon atoms, or
  (b) benzyl; and $R_3$ and $R_4$, taken together with the adjacent nitrogen atom, form a heterocyclic ring from the group of:
  (a) piperidino,
  (b) pyrrolidino,
  (c) 3-azabicyclo[3.2.2]nonan-3-yl,
  (d) morpholino, or
  (e) 4-methylpiperazino;

each of $R_6$, $R_7$, $R_8$, and $R_9$, taken singly, are:
  (a) hydrogen,
  (b) alkyl of 1 to 18 carbon atoms,
  (c) thienyl,
  (d) allyl,
  (e) carbalkoxy wherein the alkoxy moiety has 1 to 8 carbon atoms, or
  (f) phenyl;

and $R_6$ and $R_7$ or $R_8$ and $R_9$, taken together with the adjacent carbon atom on the cyclobutane ring, form a ring from the group of:
  (a) cyclohexane,
  (b) cyclopentane,
  (c) 1,4-dihydropyran,
  (d) tetrahydropyran,
  (e) norbornene, or
  (f) norbornane;

and Y and Z are alkylene radicals each having 2 to 4 carbon atoms.

4. As a cyclobutane derivative according to claim 1, 2-dimethylamino-3,3-dimethylcyclobutane methanol.

5. As a cyclobutane derivative according to claim 1, 4 - dimethylamino - 3,3 - dimethylcyclobutane - 1,2 - dimethanol.

6. As a cyclobutane derivative according to claim 1, 3-dimethylamino-2,2,4,4-tetramethylcyclobutanol.

7. As a cyclobutane derivative according to claim 1, 3,3-dimethyl-2-morpholinocyclobutane methanol.

8. As a cyclobutane derivative according to claim 1, 3,3-dimethyl-4-pyrrolidinocyclobutane-1,2-dimethanol.

9. As a cyclobutane derivative according to claim 1, 2-ethyl-3-piperidinocyclobutanol.

10. As a cyclobutane derivative according to claim 1, 2-ethyl-4,4-dimethyl-3-piperidinocyclobutanol.

11. As a cyclobutane derivative according to claim 1, 2,2-dimethyl-3-dimethylaminocyclobutanol.

No reference cited.

ALEX MAZEL, *Primary Examiner.*

J. TOVAR, A. D. ROLLINS. R. PRICE, J. W. ADAMS, *Assistant Examiners.*